June 16, 1936.  I. ROGERS  2,044,331

BEATER

Filed Feb. 5, 1934

Inventor
Ivan Rogers
By
Attorneys

Patented June 16, 1936

2,044,331

UNITED STATES PATENT OFFICE 2,044,331

BEATER

Ivan Rogers, Detroit, Mich.

Application February 5, 1934, Serial No. 709,726

3 Claims. (Cl. 261—93)

This invention relates to improvements in beaters and more particularly to the portable type of beater commonly used in the household kitchen for mixing or beating or whipping foods or mixtures of foods such as cream, eggs and so forth.

A primary object of this invention is to provide in a beater of this type means for injecting air into the mass during the beating operation whereby the mass will become aerated more rapidly and efficiently than with the old beating operation. In whipping cream or an egg for example the object of the operation is to violently agitate the material whereby air will be introduced throughout the body of the mass, the viscosity of which is sufficient to retain the air so introduced and to cause the mass to assume a light fluffy texture.

With the old beating operation this was accomplished wholly by violent agitation of the material in a dish and such agitation or beating was continued for a time sufficient to permit air from above to find its way into the mass as it was agitated. The present beater agitates the material the same as has been previously done and has all of the advantages and functions of the previous device and in addition provides means for introducing air into the lower part of the mass during the beating or agitating operation which additional air is disseminated throughout the mass by the agitation and materially hastens the aeration thereof.

Another object of this invention is to provide a beater containing the special means for admitting air into mixture which beater is of substantially the same size and weight and comparatively little more expensive to manufacture than other beaters of the old type.

Another object of the invention is to provide a structure which may be easily cleaned without disassembling.

Another object of the invention is to provide a specific construction by the use of which the beater embodying this invention can be practicably manufactured.

The invention provides various other novel features of construction and arrangement hereinafter more fully described and particularly pointed out in the claims, reference being had to the accompanying drawing, in which, Fig. 1 is a perspective view of a beater embodying this invention.

Like reference numbers refer to like parts in all of the figures.

Figure 1:
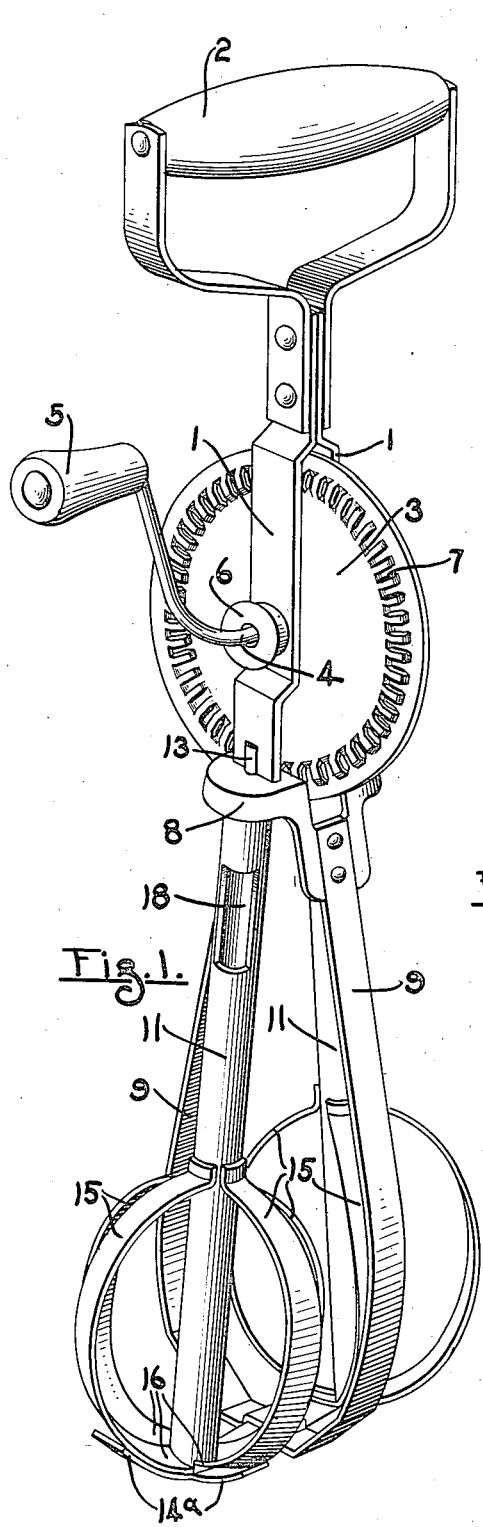
Figure 2:
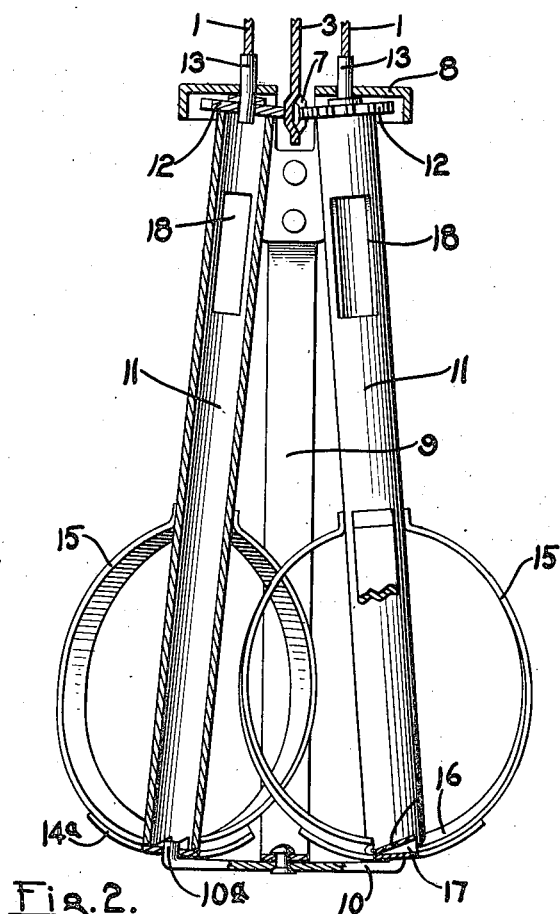
Fig. 2 is an enlarged elevation, partly in section, of the lower portion of the beater.
Figure 3:
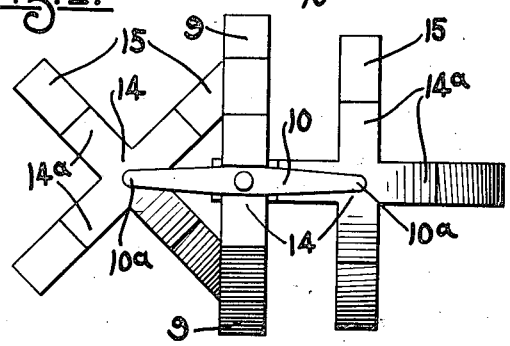
Fig. 3 is a bottom view of the beater.
Figure 4:
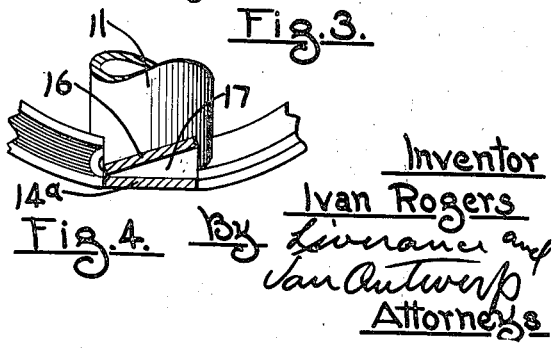
Fig. 4 is an enlarged fragmentary view, partly in section, of the extreme lower end of one of the rotating members.

The device as illustrated has a conventional frame 1 with a spade type handle 2 at its upper end. The frame 1 straddles a disk 3 fixed to a shaft 4 which shaft is bent to form a crank on which a crank handle 5 is mounted. The shaft 4 is journaled for rotation in bearings 6 mounted on the frame 1, one of the bearings 6 being hidden by the disk 3 in the perspective view, Fig. 1, and not being shown. The disk 3 is provided with gear teeth 7 near its periphery. This upper part of the structure above described is conventional and specifically forms no part of the present invention and may be altered in detail without deviation from the spirit of the invention.

The lower ends of the legs of the frame 1 are attached to a cross frame member 8. A lower frame 9 extends downwardly from the cross member 8 and has a foot member 10 attached to its lower end.

The beater is provided with two rotary beating members, each of which comprises a central tubular shaft 11. Each of the tubes 11 extends between the cross frame member 8 and the foot member 10 and is rotatably connected to each of said frame members. Each tube has attached to its upper end a gear 12, both of said gears 12 meshing with the teeth 7 of the disk 3 and journal pins 13 extend downwardly through the cross member 8 into central openings in the gears 12 forming the rotatable mountings for the upper ends of the tubes 11.

Each tube 11 is provided at its lower end with a cap 14, each cap having a central hole through which extend upturned bearing members 10a on the foot 10 which forms the lower rotatable mountings for the tubes. The axes of the tubes preferably diverge downwardly so that the lower ends are spaced farther apart than the upper ends.

The tubular shafts 11 are each provided near their lower ends with a conventional form of beater members 15 which are in the nature of arcuate blades. Four blades are preferably provided for each shaft and are arranged in diametrically opposite pairs, each pair forming a substantial circle, the lower ends of the blades being attached to the lower ends of the tubular shafts 11 and the upper ends being attached to the exteriors of the tubes. In this construction, one manner of forming the blades 15 is to provide the tube 11 originally of length sufficient to have the blades formed integrally with its lower end. In this manner of construction the lower end of the tube is split longitudinally into four strips each of which forms a blade 15 and these strips are then bent outwardly into the desired arcuate form and the ends attached to the exterior of the tube.

Whether or not the blades 15 are formed integrally with the tube as above described, the lower ends of the respective blades at the juncture with the tube are arranged in inclined planes relative to the plane of rotation as at 16. The cap 14 has radial extensions corresponding in number and width to the blades 15 and is located adjacent the lower ends of the blades 15 but the cross section of the cap 14 extends parallel with the plane of rotation and the leading edges, in the direction of rotation, of each blade and its respective cap extension 14a contact each other while the following edges of the two members are spaced apart forming a hollow wedge or inverted scoop, the interior or hollow portion thereof being in communication with the interior of the tube through openings 17.

By the above described structure each of the agitating blades 15 is provided at its lower end and at its juncture with the tube 11 with an inverted scoop having access between the interior of the scoop and the interior of the tubular shaft 11. In rotation in liquid each of the scoops forms a vacuum behind it which vacuum draws air through the tube 11 and out through the rear of the scoop into the liquid which is being beaten. The aforedescribed specific construction of scoop is not essential to attain the advantages of this invention nor is it necessary that the scoop be formed as part of the agitating blades and the specific structure shown and described is only one of various constructions which may be resorted to.

When this beater is used to beat or whip a liquid it is placed upright in the dish containing the liquid and the handle 2 is grasped by one hand of the operator to support it while the crank handle 5 is grasped by the other hand and the crankshaft 4 rotated in a direction which will cause the disk 3 to rotate the shafts 11 in a direction to move the scoops through the liquid with their closed edges advancing and their open portions following. During this operation air is admitted into the tubes through holes 18 provided therein near their upper ends and above the level of the liquid and the air is injected into the liquid mass through the open sides of the scoops by the vacuum created by moving the scoops through the liquid. Centrifugal force also enters into the action of moving the air outwardly from the tubes into the liquid.

During the rotation of the agitating members in the liquid the customary violent agitation of the liquid occurs and the beating and aerating of the mass is greatly aided by the aforedescribed introduction of air thereinto which is disseminated throughout the mass by the agitation thereof.

The device may be readily cleaned by introducing a stream of water into the upper openings 18 in the tubes and permitting it to flow out of the lower openings 17 and also by inserting a small brush into the tubes through the openings 18 which are large enough for this purpose.

The device is of substantially the same size and weight as the household beater now commonly in use and may be used as readily and with no more exertion than the old style. It is substantial in construction and has no delicate parts to become broken or worn out and can be manufactured at very little increase in expense over the old style.

The specific scoop and agitator construction herein shown and described can be considerably modified without deviating from the spirit of the invention and it is conceived that the specific agitator members may be eliminated completely and the scoops themselves, when properly shaped, can serve as agitating members.

Although the beater has been illustrated and herein described as constructed with a crank for manual operation it is conceived and readily understood that the device may be actuated by mechanical power such as an electric motor and such modifications of structure as may be required to adapt the device for mechanical power operation are conceived to come within the scope of the present invention.

The invention is defined in the appended claims and is to be considered comprehensive of all forms of structure coming within their scope.

I claim:

1. In combination, a hollow tube having an opening near one end, a portion extending from the other end of the tube and being return bent in spaced apart relation to the tube and being fastened to the tube between its ends and flat means fastened to the lower end of the tube and one edge of the said portion so as to extend angularly to the said portion to form a nozzle, said tube being cut away adjacent the flat means to provide an outlet from the tube to the said nozzle.

2. A beater comprising, a frame, a rotatable handle on said frame, an agitating member, including blades, rotatably mounted on said frame, a second agitating member, including blades, rotatably mounted on said frame in closely spaced relationship to the first agitating member whereby the blades of one agitating member interlock or mesh with the blades of the other agitating member, means, operable by the said handle, for rotating the agitating members in synchronized relationship to one another and in opposite directions whereby the mixture which is being acted upon flows and enters between the agitating members, means for receiving air at substantially room pressure, said means being located at the bottom of each agitating member and having openings along a plurality of radial lines emanating from their respective axes of rotation, said means having an exterior of tapered shape so positioned as to reduce the air pressure adjacent said openings to cause air flow therethrough whereby part of the air bubbles upwardly through that portion of the mixture which is acted upon by the other agitating member and means for supplying the second mentioned means with air.

3. A beater as recited in claim 2 in which the second mentioned means for supplying air includes straight passageways located interiorly of the agitating members, said passageways having openings of relatively large size whereby a brush may be inserted therethrough into the passageway and downwardly until it is visible through said openings.

IVAN ROGERS.